United States Patent [19]
West et al.

[11] Patent Number: 5,929,960
[45] Date of Patent: Jul. 27, 1999

[54] METHOD FOR FORMING LIQUID CRYSTAL DISPLAY CELL WALLS USING A PATTERNED ELECTRIC FIELD

[75] Inventors: John L. West, Munroe Falls, Ohio; Marc Rouberol, Boulogne Billancourt, France; Yimin Ji; James J. Francl, both of Hudson, Ohio

[73] Assignee: Kent State University, Kent, Ohio

[21] Appl. No.: 08/953,596

[22] Filed: Oct. 17, 1997

[51] Int. Cl.$^6$ .................................................. G02F 1/1339
[52] U.S. Cl. ........................................... 349/156; 349/155
[58] Field of Search ...................................... 349/156, 155

[56] References Cited

U.S. PATENT DOCUMENTS

| | | | |
|---|---|---|---|
| 3,863,332 | 2/1975 | Leupp et al. | 29/580 |
| 4,295,712 | 10/1981 | Ishiwatari | 350/344 |
| 4,636,785 | 1/1987 | Le Pesant | 340/753 |
| 4,653,864 | 3/1987 | Baron et al. | 350/344 |
| 4,682,858 | 7/1987 | Kanabe et al. | 350/334 |
| 4,705,360 | 11/1987 | Funada et al. | 350/344 |
| 4,900,132 | 2/1990 | Bos | 350/346 |
| 4,973,138 | 11/1990 | Yamazaki et al. | 350/344 |
| 5,231,527 | 7/1993 | Takanashi et al. | 359/81 |
| 5,385,499 | 1/1995 | Ogawa et al. | 445/24 |
| 5,459,598 | 10/1995 | Carrington | 359/81 |
| 5,530,567 | 6/1996 | Takei | 359/51 |
| 5,627,665 | 5/1997 | Yamada et al. | 349/156 |

OTHER PUBLICATIONS

Late–News Poster: Axially Symmetric Aligned Microcell (ASM) Mode: Electro–Optical Characteristics of New Display Mode with Excellent Wide Viewing Angle, SID Digest, SID 95 Digest (1995), pp. 575–578.

The Classical Theory of Electricity and Magnetism, Max Abraham (1950), pp. 80–108.

Patent Abstracts of Japan, JP 07072461 A, Liquid Crystal Display Device and its Manufacture, Tomita et al., Jan. 28, 1985.

Patent Abstracts of Japan, JP 61173221 A, Formation of Liquid Crystal Display Device, Shunpei et al., Jan. 28, 1985.

Patent Abstracts of Japan, JP 08320470 A2; Liquid Crystal Optical device and its Manufactured, Yuasa et al., May 25, 1995.

*Primary Examiner*—William L. Sikes
*Assistant Examiner*—Robert J. Hollingshead
*Attorney, Agent, or Firm*—Renner, Kenner, Greive, Bobak, Taylor & Weber

[57] ABSTRACT

A method for forming walls (8) between substrates (11, 12) in a liquid crystal cell (10) includes the step of forming a cell with a liquid crystal-monomer mixture (50). The cell (10) is then exposed to ultraviolet light (70) causing the monomer to be selectively polymerized to form walls (8) between substrates (11, 12) of the cell. The monomer is selectively polymerized by applying an electric field across the cell through a patterned conductive coating (31, 32) on each substrate (11, 12) to separate the dispersed monomer to the low field, interpixel regions (72). The cell (10) is then exposed to ultraviolet light (70) to polymerize the separated monomer to form the walls (8) in the low field regions (72).

11 Claims, 2 Drawing Sheets

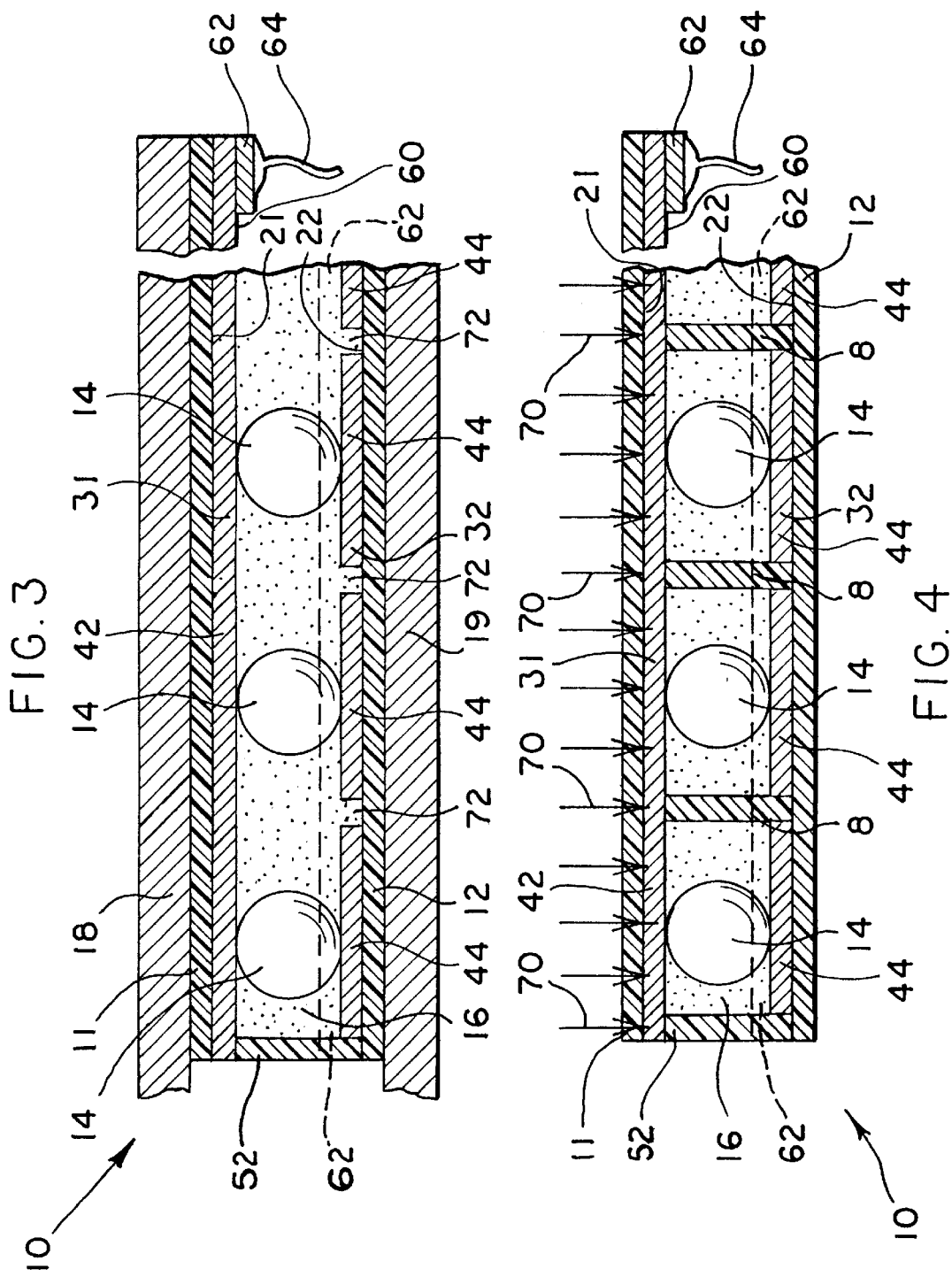

METHOD FOR FORMING LIQUID CRYSTAL DISPLAY CELL WALLS USING A PATTERNED ELECTRIC FIELD

The United States Government has a paid-up license in this invention and may have the right in limited circumstances to require the patent owner to license others on reasonable terms as provided for by the terms of Grant DMR89-20147, awarded by the National Science Foundation, and Contract No. N61331-94-K-0042, awarded by the advanced Research Projects Agency.

FIELD OF THE INVENTION

The present invention relates generally to a method for forming walls in a liquid crystal display cell. More particularly, the present invention is directed to a method for forming walls in a liquid crystal display cell by dissolving a polymerizable monomer in a liquid crystal and selectively curing the monomer to form the support walls. Specifically, the monomer is selectively cured by applying a patterned electric field to the liquid crystal-monomer mixture and exposing the mixture to ultraviolet light causing walls to form in the low-field interpixel regions.

BACKGROUND OF THE INVENTION

A typical liquid crystal display cell includes a liquid crystal sealed between two substrates. A plurality of spacers may be disposed between the substrates to maintain a constant distance between the substrates. When assembled, the internal pressure of the device may be lowered to below atmospheric such that the substrates are forced in contact with the spacers. In such an application, the substrates are relatively rigid in order to prevent the substrates from bending in the expanses between the spacers. The combination of the negative pressure and the rigidity of the glass substrates causes the distance between the substrates to be maintained even when external forces such as pinching and bending act on the display device.

In addition to the spacers, it is often desirable to provide cell walls between the substrates. A cell wall generally refers to any structure extending between substrates of the cell. The walls may be used for maintaining a constant distance between the substrates or for segregating the cell into different areas. When used to segregate, the walls prevent liquid crystal flow between selected areas of a cell. Cell walls may also be useful for preventing expansion caused by gas bubbles that diffuse through the substrate or from the liquid crystal itself.

Known processes for forming cell walls in a liquid crystal display often include undesirable steps. For instance, when the masking method is used to form the walls, the mask must be perfectly formed and perfectly aligned so that the cell walls are properly formed. These steps require precision and are time consuming. Further, perfect alignment is especially problematic when one desires to form a cell wall around each individual pixel in a liquid crystal display. The masking method is also difficult to employ with thick substrates due to the bending of light that occurs through the thick substrate. It is thus desirable to provide a method for forming walls in a liquid crystal display cell that results in accurately formed walls. It is highly desirable that the method of forming the walls does not require the step of individually selecting the walls to be formed and individually segregating the walls.

SUMMARY OF THE INVENTION

In view of the foregoing, an object of the present invention is to provide a method for forming walls between substrates in a liquid crystal display cell.

Another object of the present invention is to provide a method, as above, that includes the use of polymerizable monomer units that are dissolved in the liquid crystal in the display cell and are selectively polymerized by exposing the cell to ultraviolet light.

Yet another object of the present invention is to provide a method, as above, that includes the use of a thermoplastic dissolved in the liquid crystal in the display device which is selectively hardened by reducing the temperature of a cell while applying a patterned electric field to the cell.

Still another object of the present invention is to provide a method, as above, to selectively polymerize the monomer units by applying a patterned electric field through the liquid crystal-monomer mixture to separate the monomer units into the low field regions and then exposing the mixture to ultraviolet light until the monomer polymerizes to form the walls in the low field regions.

Another object of the present invention is to provide a method, as above, that automatically forms walls around the individual electrodes of the display cell.

These and other objects of the invention, as well as the advantages thereof over existing in prior art forms, which will be apparent in view of the following detailed specification, are accomplished by means hereinafter described and claimed.

In general, a method for forming walls in a liquid crystal cell includes the steps of providing a liquid crystal display cell having a liquid crystal-monomer mixture disposed between patterned electrically conductive coatings, applying an electric field across the cell to form low-field and high-field regions, and exposing the cell to ultraviolet light until polymer walls form in the low-field regions.

Another aspect of the present invention is achieved by a method including the steps of providing upper and lower substrates; forming patterned, electrically conductive coatings on each of the substrates; adding a liquid crystal monomer mixture to one of the substrates over the coating; positioning the other substrate over the mixture such that the coating contacts the mixture; applying an electric field to the mixture until the monomer separates to the low field regions; and exposing the substrates and mixture to ultraviolet light until the monomer polymerizes to form support walls in the low-field regions.

To acquaint persons skilled in the art most closely related to the present invention, one preferred embodiment and one alternative embodiment of a method for forming liquid crystal display cell walls using a patterned electric field is disclosed herein by, and with reference to the annexed drawings that form a part of the specification. The exemplary method is described in detail without attempting to show all of the various forms and modifications in which the invention might be embodied. As such, the embodiments shown and described herein are illustrative, and as will become apparent to those skilled in the art, can be modified in numerous ways within the spirit and scope of the invention; the invention being defined by the appended claims and their equivalent embodiments.

BRIEF DESCRIPTION OF THE DRAWINGS

FIG. 3 is a schematic, sectional side view of the display cell of FIG. 1 wherein the cell is formed with plastic substrates.

FIG. 4 is a schematic, sectional side view of the display cell depicted in FIG. 1 being exposed to ultraviolet light while being subjected to an electric field.

DESCRIPTION OF AN EXEMPLARY EMBODIMENT

Figure 1:
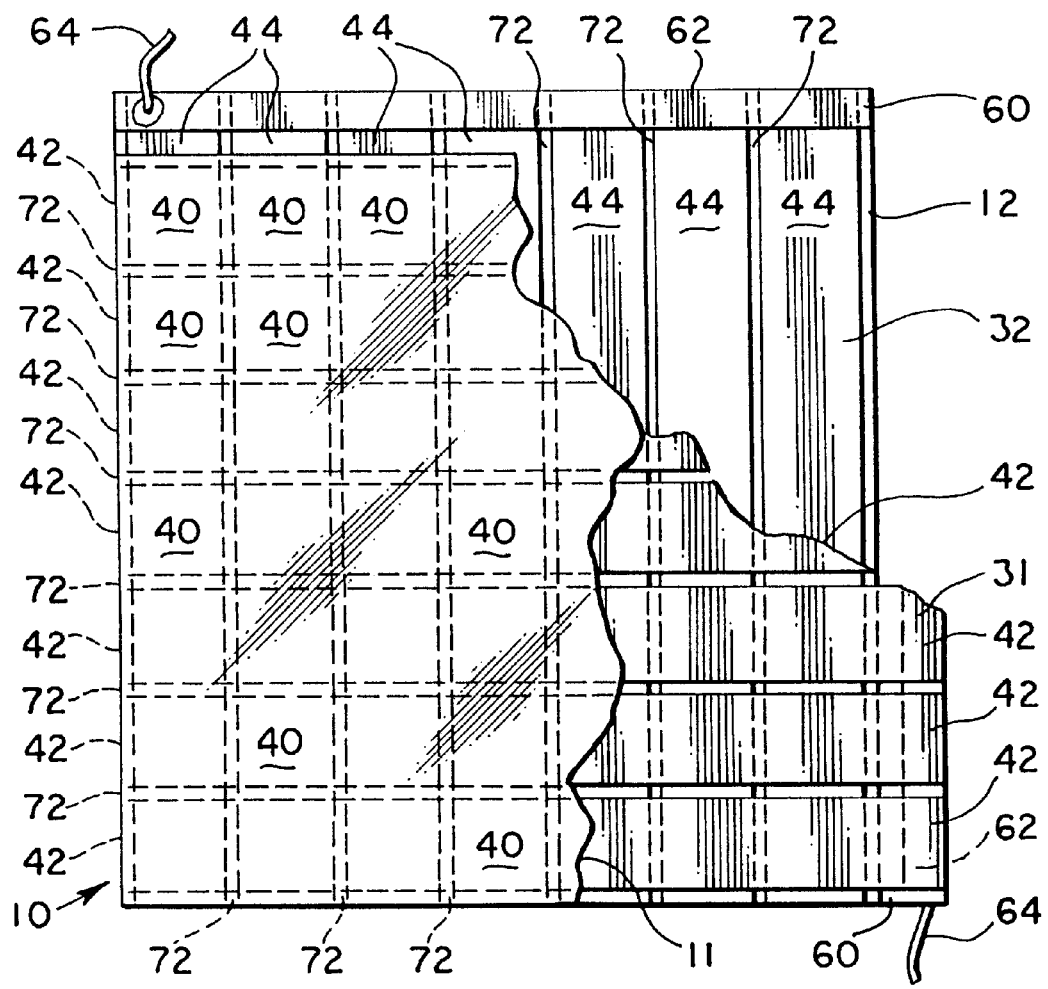
FIG. 1 is a fragmented schematic top view of a liquid crystal cell having opposed, patterned substrates that permit an electric field in conjunction with ultraviolet light to be used to selectively form walls.
Figure 2:
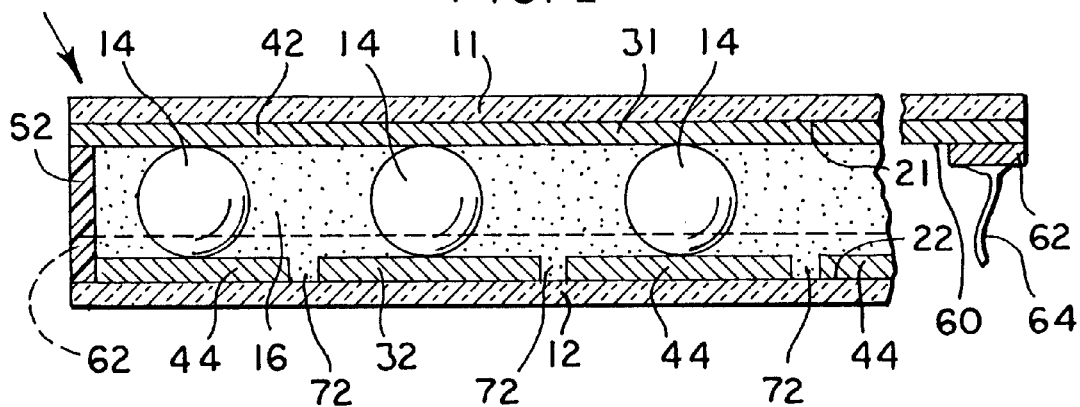
FIG. 2 is a schematic, sectional side view of the display cell depicted in FIG. 1.

An exemplary embodiment of a liquid crystal display cell having walls 8 formed by the method of the present invention using an electric field is depicted in FIGS. 1–4. A liquid crystal cell, indicated generally by the numeral 10, includes an upper substrate 11 spaced from a lower substrate 12 by a plurality of plastic ball spacers 14. A liquid crystal mixture 16 is also disposed between the substrates 11, 12. The upper substrate 11 may be either transparent plastic or transparent glass depending on the desired application of the cell 10. Although the lower substrate 12 may also be fabricated from plastic or glass, it may be fabricated from any of a variety of suitable materials because it typically does not have to be transparent. The upper substrate 11 depicted in FIG. 1 is glass while the upper substrate 11 depicted in FIG. 3 is plastic. When plastic substrates 11, 12 are used to form the cell 10, temporary external supports 18, 19 may be used to maintain a constant distance between the plastic substrates 11, 12 while the walls 8 are formed.

When using an electric field to form the support walls 8, an electrically conductive coating 31, 32 is formed in a preselected pattern on the inner surface 21, 22 of each substrate 11, 12. Typically, the cell 10 is viewed through the upper substrate 11 and thus a transparent conductive coating such as an Indium Tin Oxide (ITO) coating 31 is formed on the inner surface 21 of the upper substrate 11. The transparent coating 31 allows a person to view the liquid crystal mixture 16 through the coating 31 when the cell 10 is in use. The ITO coating 31 may be created by any of the various methods known in the art. The coating on the lower substrate 12 may also be formed from ITO but may also be any other conducting metal known in the art to be useful to form such coatings.

The coatings 31, 32 are formed in a selected pattern that ultimately determines the position of the support walls 8. The patterned coatings may be formed by any of the various methods known in this art. As may be seen in FIG. 1, the pattern is typically a grid arrangement that defines a plurality of pixels 40. The grid arrangement is created by providing a plurality of rows 42 on one of the substrates 11 and a plurality of columns 44 on the other substrate 12. Each pixel 40 may thus be referred to by a row and column number.

After the conductive coatings 31, 32 are created, a plurality of plastic ball spacers 14 having an approximate diameter of 4.5 micrometers are dispersed on the substrates 11, 12. The spacers 14 function to control the distance between the substrates 11, 12. It is generally desirable to disperse the ball spacers 14 evenly over the entire surface of each substrate 11, 12 by spin coating the ball spacers 14 onto the substrates 11, 12 at 2000 rpm for 30 seconds using a spin coater.

One liquid crystal mixture 16 that has been found to function with the method of the present invention is made up of 21% CE2, 21% CB15 and 58% E48 that is mixed with a UV curable monomer such as Norland 65 (NOA 65). The liquid crystal-monomer mixture 16 may be in the approximate range of 10 percent to 40 percent by weight Norland 65. Preferably, the mixture is 15 percent by weight Norland 65. The mixture 16 is heated until it clears and mixes well.

After the ball spacers 14 have been dispersed, the cell 10 is formed. The cell 10 may be formed by pouring the liquid crystal-monomer mixture 16 on one of the substrates 11, 12 and placing the other substrate 11, 12 on top of the mixture. Pressure is then applied to the substrates 11, 12 by a roller which applies approximately 10 psi to the substrates 11, 12. Of course, other methods for forming the cell 10 may also be used in conjunction with the concepts of the present invention.

Another method of forming a cell 10 is to place one of the substrates 11, 12 on top of the other substrate 11, 12 such that the ITO coatings 40 are facing each other. Either two or three of the edges are then sealed depending on the desired method of filling the space between the substrates 11, 12 with a liquid crystal-monomer mixture 16. When the space is filled by the method of capillary action, only two edges are initially sealed. When the vacuum method of filling is used, three edges are sealed to form a pocket. The edges may be sealed by applying a bead of ultraviolet (UV) curable epoxy to the edge and exposing the bead to ultraviolet light to form a seal 52. Such a seal 52 is only shown by way of example and is not always required.

When the cell 10 is assembled, the substrates 11, 12 are offset approximately one eighth of an inch to provide a ledge 60 on two sides of the display cell 10. A conductive tape 62 is then attached to each ledge 60 so that an electrical connection is formed between the tapes 62 and the conductive coatings 31, 32 on the substrates 11, 12. Lead wires 64 are then attached to the tapes 62 so that each tape 62 may be connected to a power source (not shown). Individual electrical connections between the power source and each row 42 and column 44 of the conductive coatings 31, 32 may also be formed to allow a person to exercise more control over the application of the electric field to the cell 10.

Generally, it is desirable to form dividing walls 8 around each pixel 40 to compartmentalize each pixel in the display. The walls 8 are formed by applying an electric field across the cell 10 which causes the monomer to separate into the low field regions 72. The cell 10 is then exposed to UV light 70 until the dispersed monomer is polymerized to form the walls 8 in the low field regions 72. Although various combinations of temperatures and voltages may be used to form the walls 8, only one preferred example and a general range are provided. Those skilled in the art will appreciate that numerous combinations may be used to create the walls 8 in accordance with the method of the present invention. One combination that has been found to be useful is to expose the cell 10 while applying 50 Volts AC while maintaining the cell 10 at 65 degrees Celsius. As the cell 10 is exposed, the walls 8 form in the low field, interpixel regions 72 around the high field, pixel regions 40. It is also known that the field could be from around 10 volts up to the tolerance of the cell 10. It is also known that the temperature may be in the general range from room temperature up to the temperature limit of the cell 10.

It has also been found that the walls 8 may be formed using a mixture 16 made from a thermoplastic dispersed in a liquid crystal. To form such walls 8, a stock mixture of 21% CE2, 21% CB15 and 58% E48 liquid crystal is used to form the liquid-crystal mixture 50. This mixture is first heated to approximately 100 degrees Celsius and stirred. A thermoplastic such as hydroxy functionalized polymethylmethacrylate supplied by Rohm and Hass is then mixed with the liquid crystal 16 and toluene is added to the mixture to assist the dispersion. The mixture may include between 20% and 50% thermoplastic.

The ITO coated substrates 11, 12 are then cleaned with methanol and the ball spacers 14 are applied using a spin coater set at 2000 rpm for approximately 30 seconds. The liquid crystal-thermoplastic mixture 16 is then spread on the open substrates 11, 12 and they are placed on a hot plate to evaporate the solvent. The two substrates 11, 12 are then pressed together with the proper overlap to form the ledges 60. For example, the substrates 11, 12 may be pressed together for approximately 5 minutes with approximately 20 psi at 100 degrees Celsius. The substrates 11, 12 are then removed from the hot plate and allowed to cool. Next, the ledges 60 are cleaned and conductive tapes 62 and lead wires 64 are applied. As explained above, individual conductive tapes 62 could be attached to each row 42 and each column 44 of conductive coating 31, 32 ifapprotional control were desired. The substrates 11, 12 are then reheated to approximately 100 degrees Celsius while applying 30 Volts for approximately 15 minutes. The cell 10 is then permitted to cool with the voltage applied. As the cell 10 cools, the thermoplastic hardens in the interpixel, low field regions 72 to form walls 8. The edges of the cell 10 may then be sealed with a UV curable epoxy if such a seal is desired.

While only a preferred embodiment of the present invention is disclosed, it is to be clearly understood that the same is susceptible to numerous modifications apparent to one skilled in the art. For instance, the descriptions of the liquid crystals, the monomers, and the thermoplastics are for exemplary purposes only and it is contemplated that other substances known to those skilled in the art may be substituted for the examples shown. The same may also be said for the exemplary temperatures and times described. Therefore, the scope of the present invention is not to be limited to the details shown and described but is intended to include all changes and modifications which come within the scope of the appended claims and their equivalents.

What is claimed is:

1. A method for forming walls in situ in a liquid crystal display cell comprising the steps of:

providing a liquid crystal display cell having a liquid crystal-monomer mixture disposed between patterned electrically conductive coatings on opposed substrates, wherein an intersection of the patterned electrically conductive coatings forms a pixel region;

applying a voltage across the cell to form a high-field region between the substrates in said pixel region and a low field region elsewhere such that the monomer separates into said low field region; and exposing the cell to ultraviolet light until polymer walls form in the low-field regions between the substrates.

2. A method according to claim 1, wherein the step of providing a liquid crystal cell comprises the steps of:

providing upper and lower substrates;

applying a patterned electrically conductive coating to each substrate;

adding a liquid crystal monomer mixture to one of the substrates; and forming the cell by placing one of the substrates over the other substrate.

3. A method according to claim 2, further comprising the step of offsetting one substrate to form a pair of ledges.

4. A method according to claim 3, further comprising the step of attaching a conductive tape to the ledge such that the tape forms an electrical connection with the conductive coating.

5. A method according to claim 2, further comprising the step of sealing the edges of the cell.

6. A method according to claim 1, further comprising the step of heating the cell to substantially 65 degrees celsius.

7. A method according to claim 1, further comprising the step of applying 50 volts AC to the cell.

8. A method for forming walls in situ in a liquid crystal display cell comprising the steps of:

providing upper and lower substrates;

forming patterned, electrically conductive coatings on each of the substrates, wherein an intersection of the patterned electrically conductive coatings forms a pixel region;

adding a liquid crystal-monomer mixture to one of the substrates over the coating;

positioning the other substrate over the mixture such that the coating contacts the mixture;

applying a voltage across the mixture to form a high field region between the substrates in said pixel region and a low field region elsewhere such that the monomer separates into said low field region; and exposing the mixture to ultraviolet light until walls form in the low-field regions between the substrates.

9. A method according to claim 8, further comprising the step of dispersing ball spacers on the substrates before the mixture is added.

10. A method according to claim 8, further comprising the steps of:

forming a row pattern of conductive coating on one of the substrates and a column pattern of conductive coating on the other substrate; and assembling the substrates so that the row pattern and column pattern cooperate to form a grid pattern.

11. A method for forming walls in situ in a liquid crystal cell comprising the steps of:

providing upper and lower substrates;

forming patterned, electrically conductive coatings on each of the substrates, wherein an intersection of the patterned electrically conductive coatings forms a pixel region;

adding a liquid crystal-thermoplastic mixture to one of the substrates over the coating;

positioning the other substrate over the mixture such that the coating contacts the mixture;

heating the mixture;

applying an electric field across the mixture to form a high field region between the substrates in said pixel region and a low field region elsewhere such that the thermoplastic separates into said low field region; and cooling the mixture until the thermoplastic hardens in the low field regions to form walls between the substrates.

\* \* \* \* \*